United States Patent [19]

Onozuka

[11] Patent Number: 5,379,080
[45] Date of Patent: Jan. 3, 1995

[54] IMAGE PROJECTOR SYSTEM

[75] Inventor: Kuniharu Onozuka, Kanagawa, Japan

[73] Assignee: Sony Corporation, Tokyo, Japan

[21] Appl. No.: 189,719

[22] Filed: Feb. 1, 1994

[30] Foreign Application Priority Data

Feb. 10, 1993 [JP] Japan .................................. 5-022914

[51] Int. Cl.6 ............................................ G03B 21/00
[52] U.S. Cl. ...................................... 353/37; 353/38;
353/99; 359/49
[58] Field of Search ................ 353/37, 38, 98, 99,
353/69, 70; 359/41, 40, 48, 49, 70, 850–852;
362/331, 333, 334, 336, 346, 297

[56] References Cited

U.S. PATENT DOCUMENTS

| | | | |
|---|---|---|---|
| 4,969,731 | 11/1990 | Ogino et al. | 353/38 |
| 4,971,436 | 11/1990 | Aoki et al. | 353/98 |
| 5,101,279 | 3/1992 | Kurematsu et al. | 359/40 |
| 5,128,787 | 7/1992 | Blouder | 359/851 |
| 5,250,967 | 10/1993 | Miyashita | 353/37 |

FOREIGN PATENT DOCUMENTS 4107420 4/1992 Japan .................................. 359/40

Primary Examiner—William A. Cuchlinski, Jr.
Assistant Examiner—William C. Dowling
Attorney, Agent, or Firm—Jay H. Maioli

[57] ABSTRACT

Parallel rays of light emitted from a light source are reflected at an angle of approximately 90° by a first reflecting mirror toward a liquid crystal panel. The light reflected from the first reflecting mirror is applied to the pixels of the liquid crystal panel through a light guide lens. An image formed on the liquid crystal panel is projected on a second reflecting mirror through an auxiliary projection lens. The second reflecting mirror has a concave surface formed on the lower end portion thereof such that the concave surface gradually changes into a flat surface toward the upper end thereof. Thus, the second reflecting mirror reflects the image projected by the auxiliary projection lens such that the lower end portion of the image is reduced in size by the concave surface of the mirror. When the reflected image is projected through a projection lens on a screen inclined with respect to the optical axis of the projection lens, it is displayed as a normal image with the trapezoidal distortion effectively corrected.

8 Claims, 8 Drawing Sheets

Image information

IMAGE PROJECTOR SYSTEM

BACKGROUND OF THE INVENTION

1. Field of the Invention

The present invention relates to image projector systems and, more particularly, to an image projector system of the type in which an image formed on a liquid crystal panel is projected by light and displayed on a screen as an enlarged image.

2. Description of the Background Art

Figure 1:
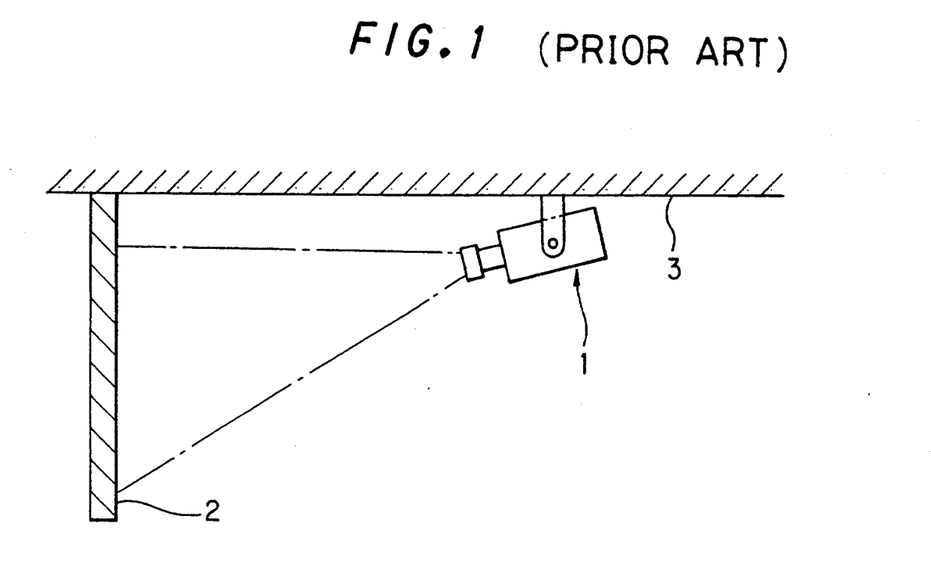
FIG. 1 illustrates a common example of installation of an image projector system.

As a system for displaying an image on a large screen, an image projector system such as that shown in FIG. 1 is known. The image projector system 1 is installed, for example, on a ceiling 3 of an airplane, and an image projected from the system 1 is displayed on a screen 2, thereby allowing a large number of passengers to view a movie or various kinds of image information.

Figure 2:
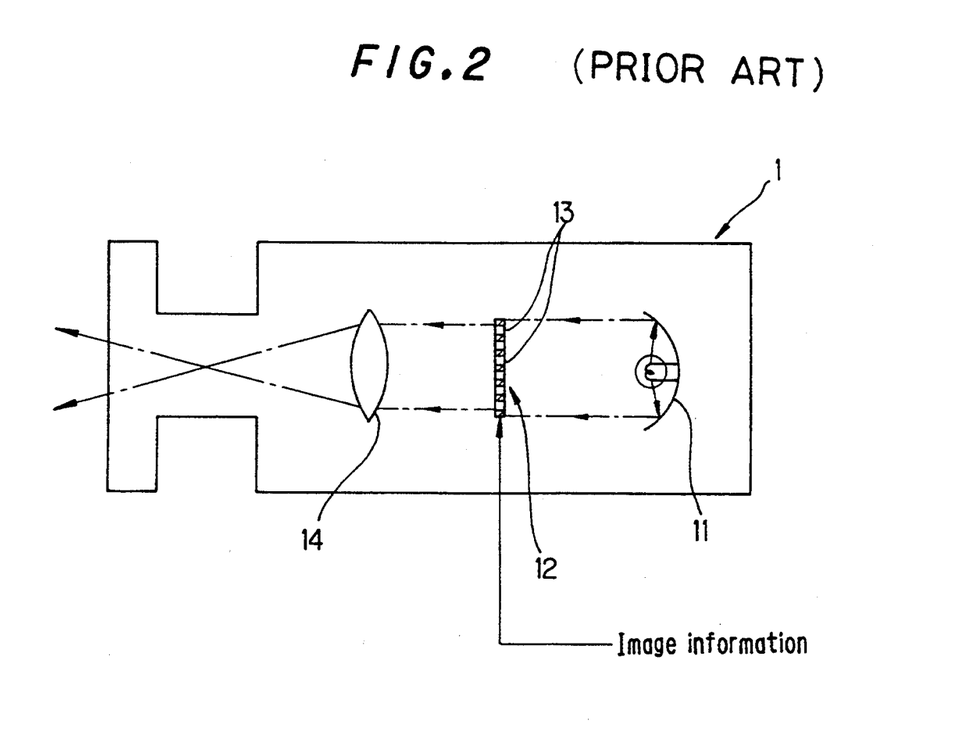
FIG. 2 shows the arrangement of a conventional image projector system.

As shown in FIG. 2, the conventional image projector system 1 includes a light source 11 for emitting parallel rays of light, a liquid crystal panel 12, and a projection lens 14. The liquid crystal panel 12 is composed of a large number of pixels 13 each of which is controlled so as to transmit or intercept light on the basis of image information externally supplied. Thus, an image is formed on the liquid crystal panel 12, and this image is projected on the projection lens 14 by light emitted from the light source 11. The image is enlarged by the projection lens 14 and projected on the screen 2, thereby enabling the enlarged image to be displayed on the screen 2.

As shown in FIG. 1, when the image projector system 1 is to be installed in an airplane, the body of the image projector system 1 is commonly installed on the ceiling 3 so that it will not interfere with the passengers when they are viewing the image displayed on the screen 2. Since the screen 2 is installed to extend vertically from the ceiling 3, the image to be displayed is projected on the screen 2 obliquely downward from the image projector system 1.

Figure 3:
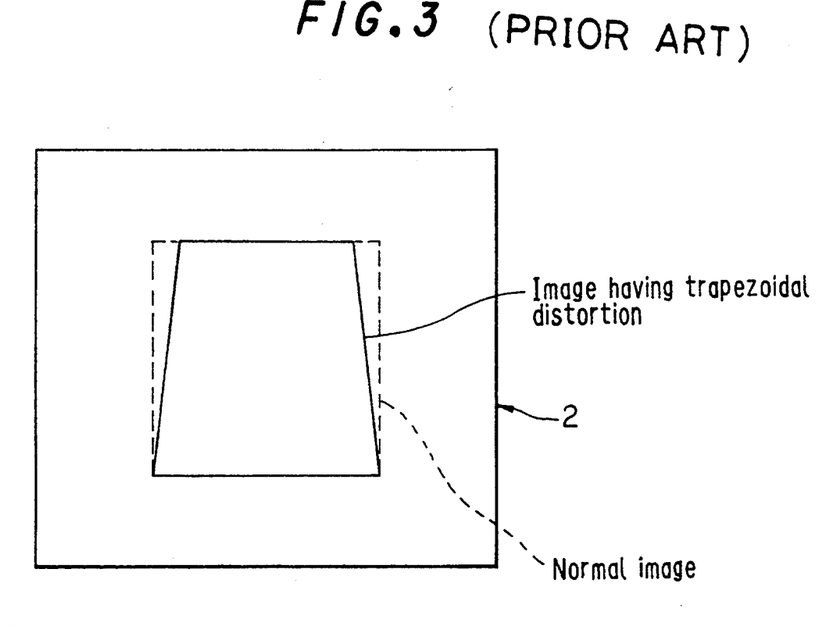
FIG. 3 illustrates trapezoidal distortion occurring in the conventional image projector system.

Accordingly, the distance between the projection lens 14 and the upper side of the screen 2 is shorter than the distance between the projection lens 14 and the lower side of the screen 2. Consequently, when a square image, for example, is displayed on the screen 2, the image is distorted into the shape of a trapezoid in which the top side is relatively short, while the bottom side is relatively long, as shown in FIG. 3.

Figure 4:
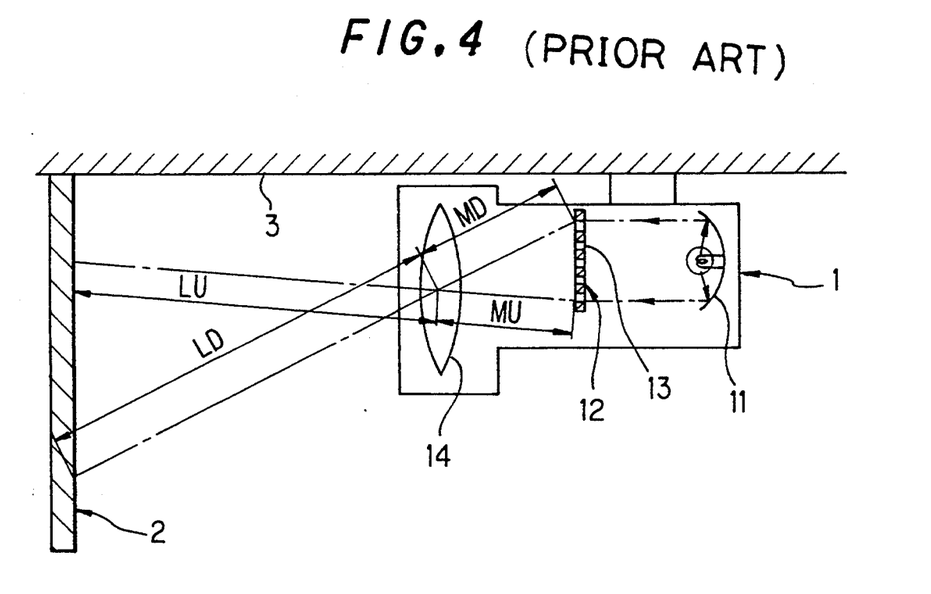
FIG. 4 shows the arrangement of a conventional image projector system devised to prevent occurrence of trapezoidal distortion.

To correct such trapezoidal distortion, an image projector system 1 in which the optical axis of the projection lens 14 is displaced from the center of the liquid crystal panel 12, as shown in FIG. 4, has been proposed in Japanese Patent Application No. 04-360122 (1992) by the present applicant. In the proposed image projector system 1, the projection lens 14 is installed so that the optical axis thereof is perpendicular to the screen 2. In this state, the relationship between the liquid crystal panel 12, the projection lens 14 and the screen 2 satisfies the condition of $LU/MU = LD/MD$; therefore, no trapezoidal distortion occurs. Accordingly, the image is normally displayed on the screen 2.

In this image projector system 1, however, since the optical axis of the projection lens 14 is off the mutual center of the light source 11 and the liquid crystal panel 12, the efficiency of utilization of light emitted from the light source 11 is lowered. Therefore, in order to make the luminance of the image on the screen 2 equal to the normal level it is necessary to increase the brightness of the light source 11, which gives rise to the problem that the power consumption increases. In addition, as will be understood from the figure, the aperture of the projection lens 14 must be increased in order to capture and project as an enlarged image all the rays of light transmitted by the liquid crystal panel 12. The increase in the aperture of the projection lens 14 results in an increase in the overall size of the system and also an increase in the cost.

To avoid such problems, another conventional image projector system 1 is provided with a lens (not shown) for directing the light transmitted by the liquid crystal panel 12 toward the optical axis of the projection lens 14. However, with this arrangement, the number of parts required increases and the cost rises.

SUMMARY OF THE INVENTION

It is an object of the present invention to provide an image projector system which is capable of preventing occurrence of trapezoidal distortion with a simple arrangement.

The present invention provides an image projector system including a light source, a liquid crystal panel having a plurality of pixels controllable so as to transmit or intercept light on the basis of image information, and a projection lens for capturing and projecting as an enlarged image light emitted from the light source and transmitted through the liquid crystal panel. The image projector system further includes a reflecting mirror having a plurality of concave or convex mirrors and situated between the light source and the liquid crystal panel so that light emitted from the light source is reflected by the concave or convex mirrors to enter the liquid crystal panel.

According to another aspect of the present invention, the image projector system includes an auxiliary projection lens including a large number of convex lenses situated on the light emergence side of the liquid crystal panel to correspond to the pixels, respectively, and a large number of concave lenses situated on the light emergence side of the convex lenses and within the focal length of the convex lenses. The concave lenses have approximately the same focal length as that of the convex lenses. Light emerging from the concave lenses is captured and projected as an enlarged image by the projection lens.

According to still another aspect of the present invention, the image projector system includes a reflecting mirror having a concave or convex surface formed on one end portion thereof such that the concave or convex surface gradually changes into a flat surface toward the other end. The reflecting mirror is situated between the liquid crystal panel and the projection lens so that light transmitted by the liquid crystal panel is incident on the projection lens through the reflecting mirror.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and of which.

DESCRIPTION OF THE PREFERRED EMBODIMENTS

One embodiment of the image projector system according to the present invention will be described below in detail with reference to the accompanying drawings. It should be noted that in the figures related to the present invention the same elements as those described above are denoted by the same reference numerals, and detailed description thereof is omitted.

Figure 5:
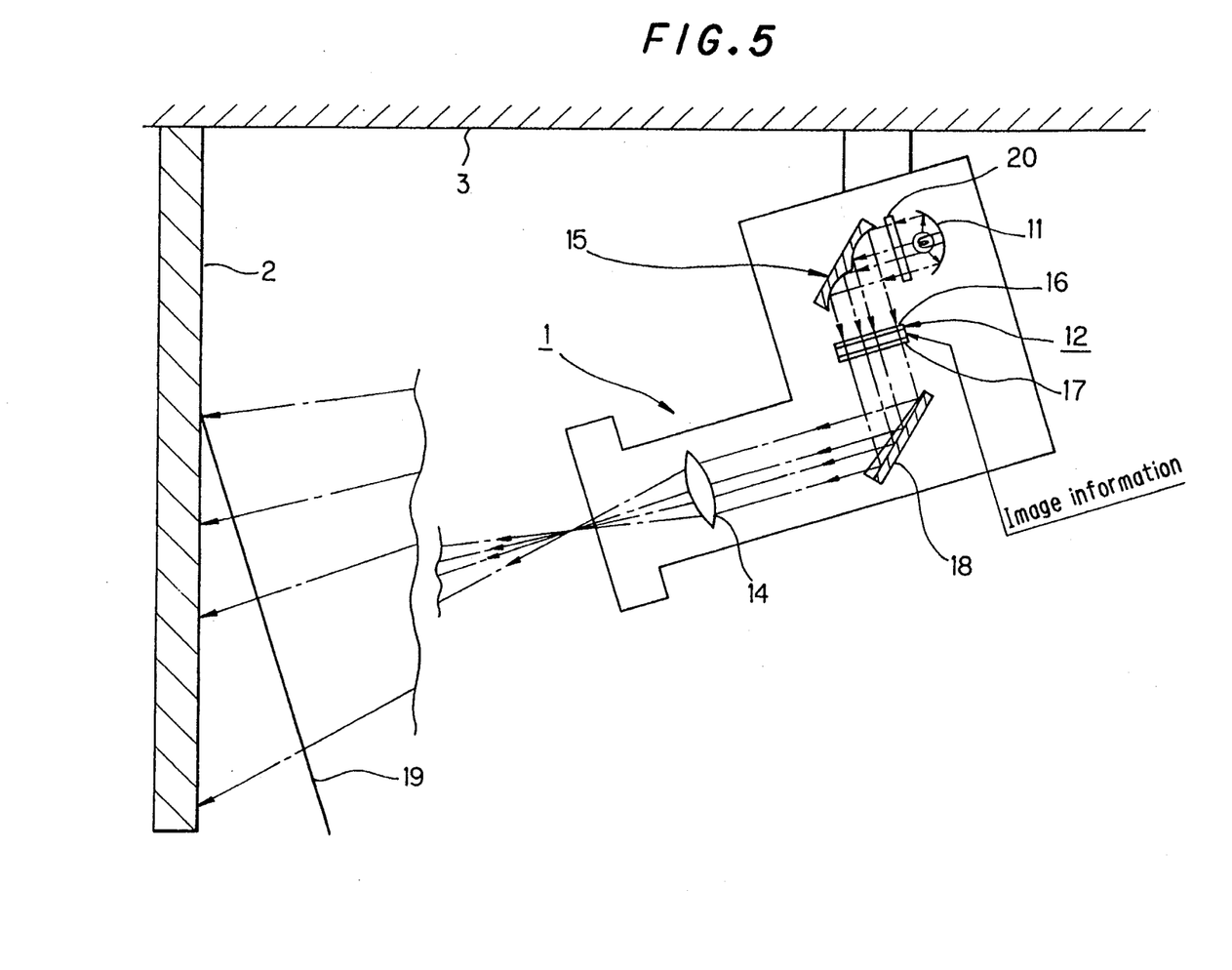
FIG. 5 shows the arrangement of one embodiment of the image projector system according to the present invention.

FIG. 5 shows the arrangement of an image projector system 1 according to the present invention. The image projector system 1 is suitable for use in a case where it is installed, for example, on a ceiling 3 at a proper angle of inclination to project an enlarged image on a screen 2 installed to extend vertically from the ceiling 3.

Figure 6A:
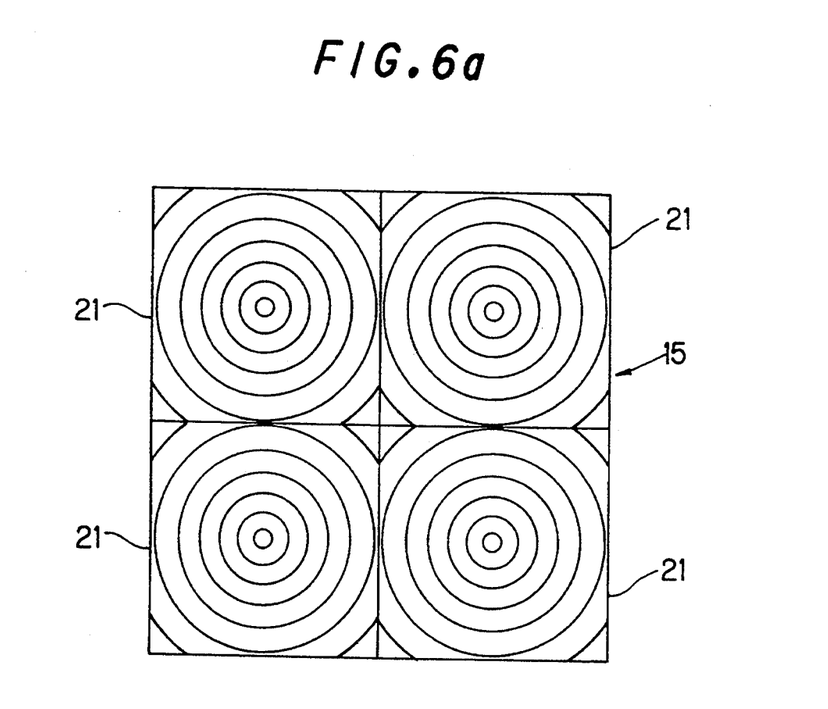
FIG. 6(a) shows the arrangement of a first reflecting mirror used in the image projector system of the present invention.

In the image projector system 1, parallel rays of light emitted from a light source 11 are incident on a first reflecting mirror 15 through an ultraviolet cutoff filter 20. The first reflecting mirror 15 reflects the light at a proper angle (90° in this embodiment) so that the reflected light enters a liquid crystal panel 12. As shown at (a) in FIG. 6, the first reflecting mirror 15 includes a plurality (4 in this embodiment) of concave mirrors 21 which are disposed in close proximity to each other on the same plane. Each concave mirror 21 is disposed so that the distance between the center of the concave mirror 21 and the light source 11 is approximately equal to the focal length of the concave mirror 21.

Figure 6B:
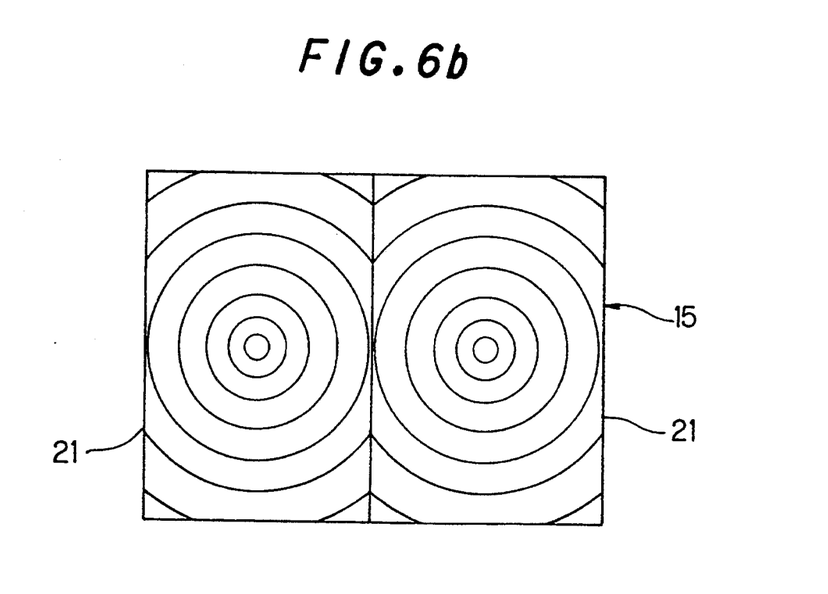
FIG. 6(b) shows another arrangement of a first reflecting mirror used in the image projector system of the present invention.

Thus, the parallel rays of light incident on the first reflecting mirror 15 are reflected with an approximately uniform illuminance. It should be noted that the first reflecting mirror 15 may be composed of two concave mirrors 21, as shown at (b) in FIG. 6. Thus, any number of concave mirrors 21 may be used to constitute the first reflecting mirror 15. Each concave mirror 21 is formed from a material which transmits infrared rays but reflects visible light. Since the ultraviolet cutoff filter 20 lies in front of the first reflecting mirror 15, the liquid crystal panel 12 can be prevented from being damaged by infrared or ultraviolet rays.

Furthermore, the first reflecting mirror 15 can be prevented from heating to a high temperature by cooling, for example, the rear side of the first reflecting mirror 15. Thus, the liquid crystal panel 12 can be prevented from being damaged by heat dissipated from the first reflecting mirror 15. It should be noted that the first reflecting mirror 15 may be composed of a plurality of convex mirrors (not shown).

Figure 7:
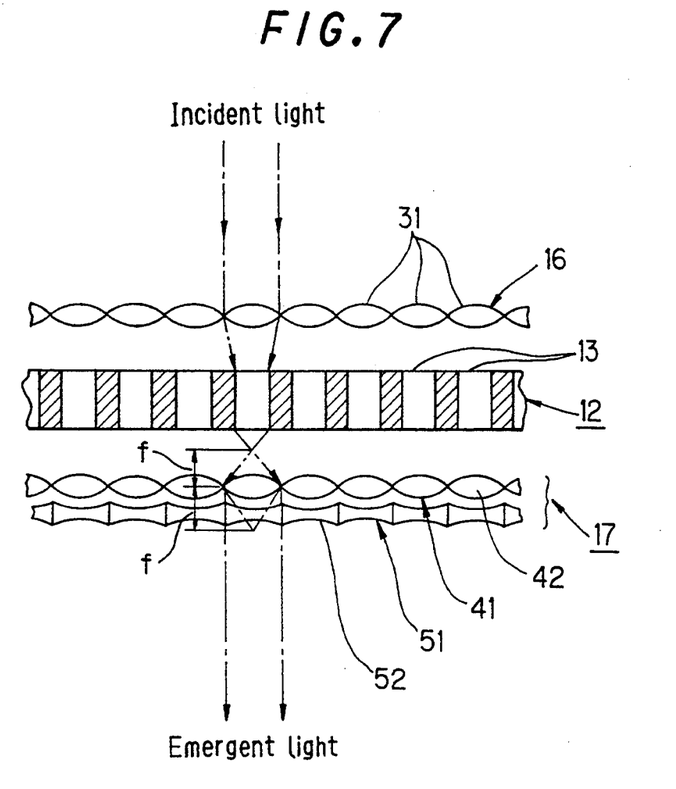
FIG. 7 shows the respective arrangements of a liquid crystal panel, a light guide lens and an auxiliary projection lens used in the image projector system of the present invention.

The parallel light rays of uniform illuminance reflected from the first reflecting mirror 15 are made incident on the light entrance side of the liquid crystal panel 12 through a light guide lens 16. As shown in FIG. 7, the light guide lens 16 is composed of a large number of convex lenses 31 disposed on the same plane. The respective optical axes of the convex lenses 31 are parallel to each other and in alignment with the centers of the corresponding pixels 13 of the liquid crystal panel 12. The light guide lens 16 enables the incident light to enter each pixel 13 of the liquid crystal panel 12 efficiently.

The liquid crystal panel 12 has each pixel 13 controlled so as to transmit or intercept light in accordance with image information externally supplied, thereby enabling an image to be formed on the liquid crystal panel 12. The image is projected on an auxiliary projection lens 17 by the light applied from the light guide lens 16.

The auxiliary projection lens 17 includes a multi-convex lens 41 and a multi-concave lens 51. The multi-convex lens 41 is situated on the liquid crystal panel side. The multi-concave lens 51 is situated on the second reflecting mirror side in parallel to the multi-convex lens 41. The multi-convex lens 41 is composed of a large number of convex lenses 42 which are situated on the same plane so that the respective optical axes of the convex lenses 42 are parallel to each other, and that the liquid crystal panel 12 lies outside the focal length f of each convex lens 42.

The multi-concave lens 51 is composed of a large number of concave lenses 52 which are disposed on the same plane so that the respective optical axes of the concave lenses 52 are parallel to each other. Each concave lens 52 of the multi-concave lens 51 is disposed within the focal length f of the corresponding convex lens 42 of the multi-convex lens 41. The optical axes of each pair of associated convex and concave lenses 42 and 52 are in alignment with the center of the corresponding pixel 13 of the liquid crystal panel 12.

Figure 8:
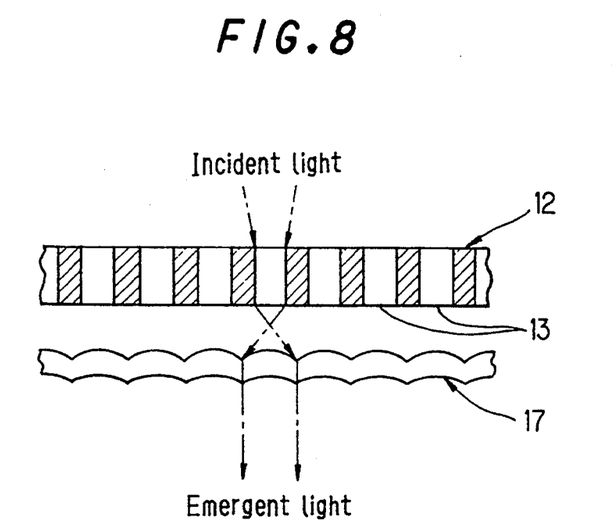
FIG. 8 shows the arrangement of another example of the auxiliary projection lens.

The focal lengths of the convex and concave lenses 42 and 52 are set approximately equal to each other. Thus, the overall focal length of the auxiliary projection lens 17 becomes sufficiently long, so that light transmitted by the pixels 13 of the liquid crystal panel 12 is projected in the form of approximately parallel rays by the auxiliary projection lens 17. Accordingly, the image formed on the liquid crystal panel 12 is projected from the auxiliary projection lens 17 as an image of approximately the same size as that of the original image. The auxiliary projection lens 17 may be integrally formed as one unit having a convex surface on one side and a concave surface on the other, as shown in FIG. 8. By doing so, the number of parts required decreases, and it is possible to reduce the number of assembling steps required for production of the image projector system 1. The image projected from the auxiliary projection lens 17 is made incident on a projection lens 14 through a second reflecting mirror 18 (see FIG. 5).

Figure 9:
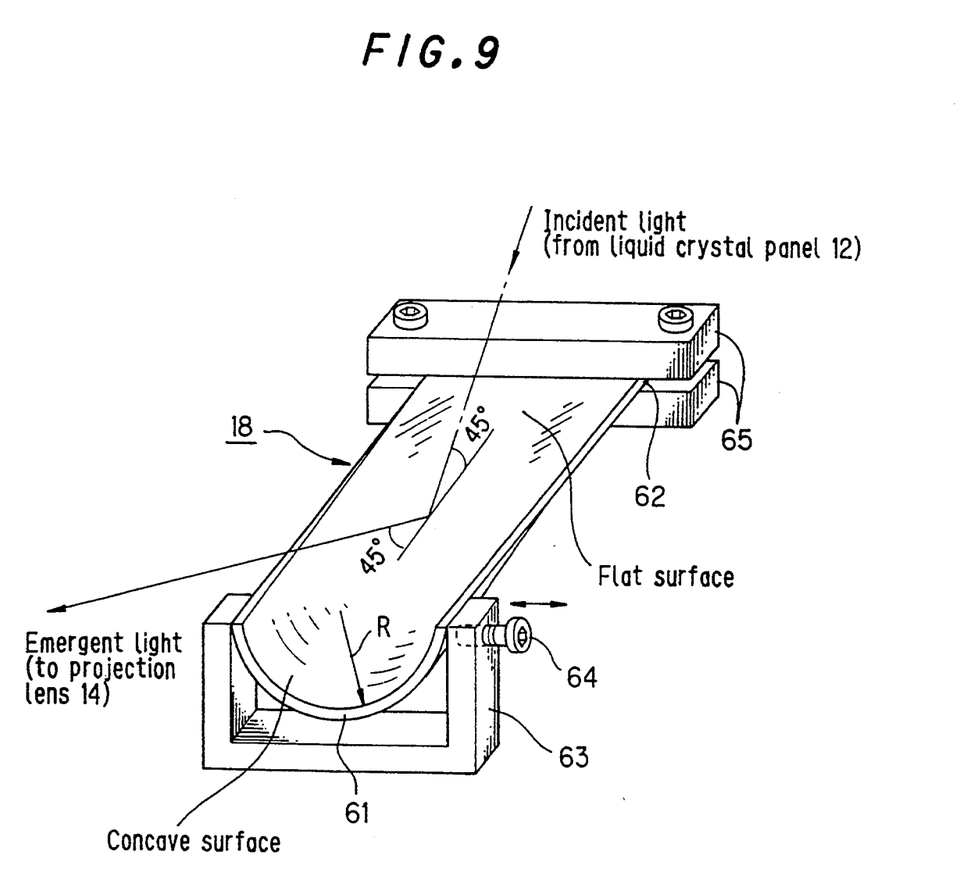
FIG. 9 shows the arrangement of a second reflecting mirror used in the image projector system of the present invention.

The second reflecting mirror 18 is situated so that the reflecting surface thereof intersects the optical axis of the auxiliary projection lens 17 at approximately 45°. The second reflecting mirror 18 is formed from an elastic material, e.g., a plastic material, such that the lower end portion 61 has a concave surface and this concave surface gradually changes into a flat surface toward the upper end portion 62. In addition, a curvature adjusting bolt 64 is adjustably threaded into a support 63 for the lower end portion 61 so that the curvature radius R of the concave surface can be changed by adjusting the bolt 64. The upper end portion 62 is strongly held by a holder 65 so that the flat surface is maintained even when the curvature radius R of the lower end portion 61 is changed.

In the second reflecting mirror 18, light obliquely incident on the reflecting surface from above it, that is, the image formed on the liquid crystal panel 12, is reflected obliquely downward. The reflected image has such a configuration that the upper end portion of the image has the same size as that of the incident image, and the image gradually decreases in size toward the lower end thereof.

Figure 10:
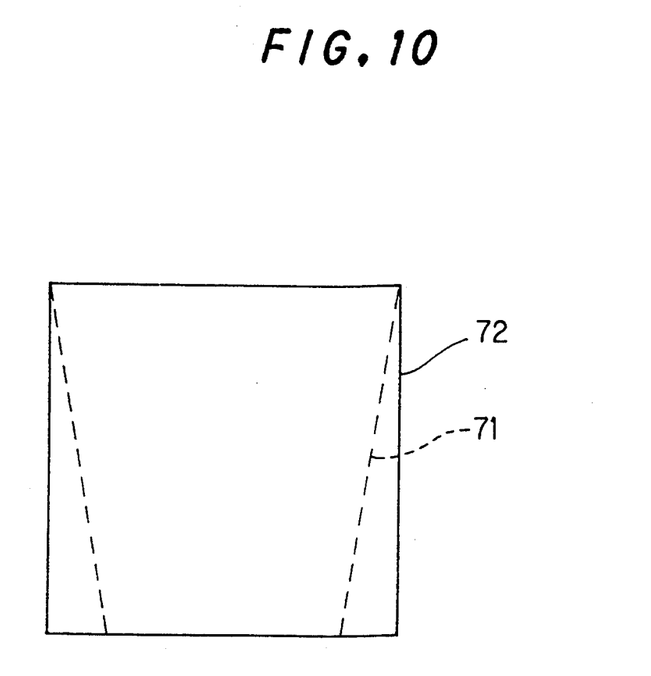
FIG. 10 illustrates an image on a plane perpendicular to the optical axis of a projection lens and also an image on a screen in the image projector system of the present invention.

The image reflected by the second reflecting mirror 18 is enlarged and projected on the screen 2 by the projection lens 14. In a case where square image information, for example, is supplied to the liquid crystal panel 12, if a plane 19 (see FIG. 5) perpendicular to the optical axis of the projection lens 14 is assumed to lie in the vicinity of the screen 2, the image formed on the plane 19 a trapezoidal shape in which the bottom side is smaller than the top side, as shown by the broken lines 71 in FIG. 10. When this image is projected on the screen 2, it becomes a square image similar to the original image, as shown by the solid lines 72 in the figure.

That is, in the image projector system 1 of the present invention, to correct trapezoidal distortion occurring due to the positional relationship between the image projector system 1 and the screen 2, distortion which is opposite to the trapezoidal distortion is previously generated at the second reflecting mirror 18, thereby enabling a normal image to be displayed on the screen 2. Even when the positional relationship between the image projector system 1 and the screen 2 is changed, a normal image can be displayed on the screen 2 by properly adjusting the curvature radius R of the concave surface of the second reflecting mirror 18.

Figure 11:
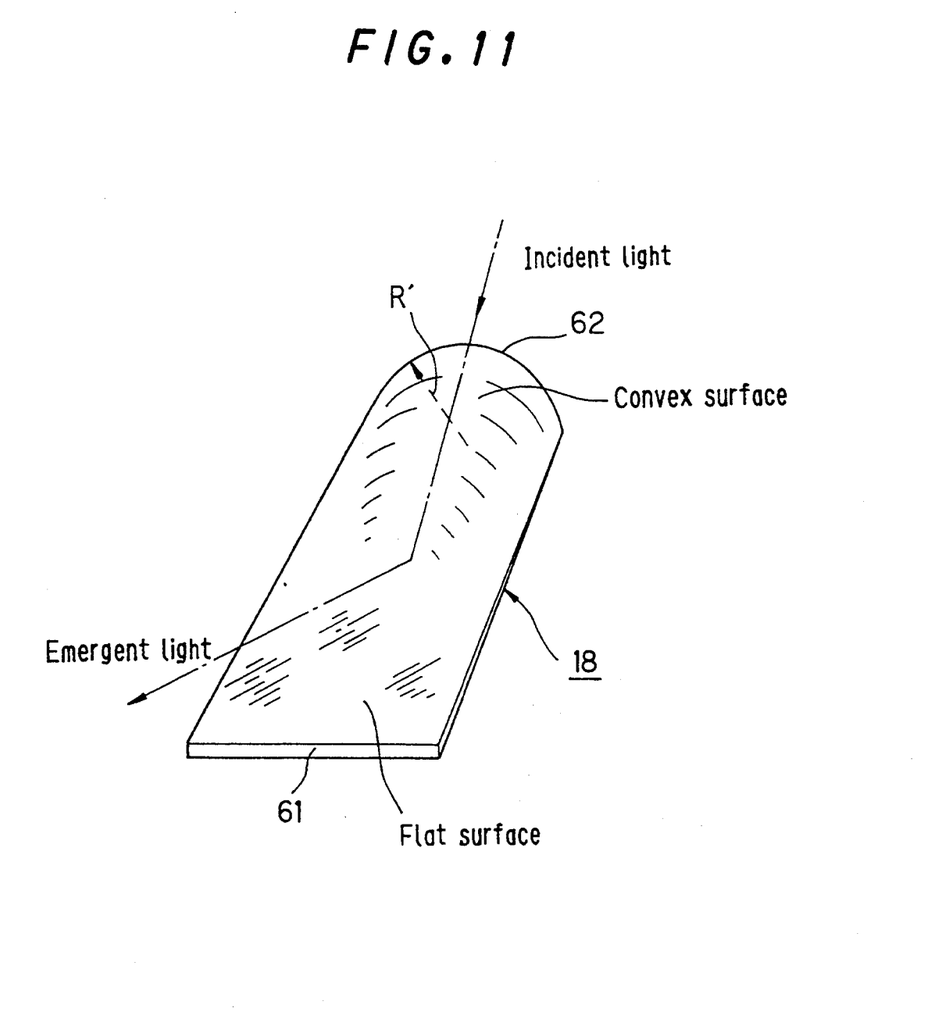
FIG. 11 shows the arrangement of another example of the second reflecting mirror.

Although in the above-described embodiment the second reflecting mirror 18 has a concave surface on the lower end portion 61 and a flat surface on the upper end portion 62, the second reflecting mirror 18 may be arranged such that the upper end portion 62 has a convex surface, and the lower end portion 61 has a flat surface, as shown in FIG. 11. With this arrangement, the image reflected by the second reflecting mirror 18 is distorted such that the upper end portion thereof is relatively large. Therefore, it becomes a normal image on the screen 2. The second example of the second reflecting mirror 18 may be arranged so that the curvature radius R' of the convex surface is adjustable. In doing so, even when the installation position of the image projector system 1 is changed, a normal image can be displayed on the screen 2 at all times.

Further, although in the foregoing embodiment the second reflecting mirror 18 is disposed so that the reflecting surface thereof is at 45° to the incident light, the angle at which the second reflecting mirror 18 is installed may be set as desired.

As has been described above, the present invention provides an image projector system in which light emitted from a light source is made incident on a liquid crystal panel through a plurality of concave or convex mirrors. Accordingly, light of uniform illuminance is incident on the liquid crystal panel. Therefore, the luminance of the displayed image is uniform, and the screen becomes easy to view.

In addition, a large number of convex lenses are situated on the light emergence side of the liquid crystal panel in the image projector system to correspond to the pixels, respectively, and a concave lens is situated on the light emergence side of each convex lens and within the focal length thereof. Accordingly, light emerging from the liquid crystal panel is formed into parallel rays of light through the convex and concave lenses. Therefore, it is possible to obtain an image which is free from distortion and has a uniform luminance.

In addition, a reflecting mirror, in which one end portion thereof has a convex or concave surface and this surface gradually changes into a flat surface toward the other end, is disposed on the light emergence side of the liquid crystal panel in the image projector system. Accordingly, an image formed on the liquid crystal panel is distorted by the reflecting mirror before being projected on the screen, thereby correcting trapezoidal distortion occurring on the screen. Thus, a normal image can be obtained on the screen. In addition, since it is possible to prevent occurrence of trapezoidal distortion without the need to displace the center of the liquid crystal panel and the optical axis of the projection lens from each other, it becomes possible to minimize the size of the projection lens and also possible to simplify the arrangement. It is therefore possible to reduce the cost. Furthermore, since trapezoidal distortion can be corrected with ease by adjusting the curvature of the convex or concave surface while an image is being displayed on the screen, a normal image can readily be obtained even when the body of the image projector system is moved to a desired place for use.

Although the present invention has been described through specific terms, it should be noted here that the described embodiments are not necessarily exclusive and that various changes and modifications may be imparted thereto without departing from the scope of the invention which is limited solely by the appended claims.

What is claimed is:

1. An image projector system including a light source, a liquid crystal panel having a plurality of pixels controllable so as to selectively transmit or intercept light on the basis of image information fed thereto, and a projection lens for capturing and projecting as an enlarged image light emitted from said light source and transmitted through said liquid crystal panel, said image projector system comprising:
    a reflecting mirror having a plurality of reflecting surfaces and disposed between said light source and said liquid crystal panel so that light emitted from said light source is reflected by said plurality of reflecting surfaces to enter said liquid crystal panel.

2. An image projector system according to claim 1, wherein said plurality of reflecting surfaces comprises a plurality of concave reflecting surfaces disposed in close proximity to each other so as to be coplanar and so that distances between respective centers of each of said concave reflecting surfaces and said light source are substantially equal to the focal lengths of each of said concave reflecting surfaces.

3. An image projector system including a light source, a liquid crystal panel having a plurality of pixels controllable so as to selectively transmit or intercept light on the basis of image information fed thereto, and a projection lens for capturing and projecting as an enlarged image light emitted from said light source and transmitted through said liquid crystal panel, said image projector system comprising:

an auxiliary projection lens including a number of convex lenses equal in number to said plurality of pixels and being disposed on a light emergence side of said liquid crystal panel to correspond to said pixels, respectively, and a number of concave lenses equal in number to said plurality of pixels and being disposed on a light emergence side of said convex lenses and within the focal length of said convex lenses, said concave lenses having a focal length substantially equal to a focal length of said convex lenses, so that light emerging from said concave lenses is captured and projected as an enlarged image by said projection lens.

4. An image projector system according to claim 3, wherein said convex and concave lenses of said auxiliary projection lens are integrally formed as one unit.

5. An image projector system according to claim 3, wherein said convex lenses of said auxiliary projection lens are disposed so as to be coplanar and so that the respective optical axes of said convex lenses are parallel to each other, said liquid crystal panel being disposed outside the focal length of each of said convex lenses.

6. An image projector system including a light source, a liquid crystal panel having a plurality of pixels controllable so as to selectively transmit or intercept light on the basis of image information fed thereto, and a projection lens for capturing and projecting as an enlarged image light emitted from said light source and transmitted through said liquid crystal panel, said image projector system comprising:

a reflecting mirror having a reflecting surface formed on one end portion thereof such that said reflecting surface gradually changes into a flat surface toward the other end portion of said reflecting mirror, said reflecting mirror being disposed between said liquid crystal panel and said projection lens so that light transmitted by said liquid crystal panel is reflected by said reflecting surface and is incident on said projection lens.

7. An image projector system according to claim 6, wherein said reflecting mirror is formed from an elastic material and has a holder for holding said one end portion thereof, and curvature adjusting means are provided at the other end portion of said mirror.

8. An image projector system according to claim 6, wherein said reflecting mirror is disposed so that said reflecting surface thereof intersects the optical axis of said projection lens at approximately 45°.

* * * * *